United States Patent
Sasson et al.

(10) Patent No.: US 10,315,953 B2
(45) Date of Patent: Jun. 11, 2019

(54) ADDITIVE-INCORPORATED BUILDING MATERIALS

(71) Applicant: YISSUM RESEARCH DEVELOPMENT COMPANY OF THE HEBREW UNIVERSITY OF JERUSALEM LTD., Jerusalem (IL)

(72) Inventors: Yoel Sasson, Jerusalem (IL); Hani Gnayem, Baqa-El Gharbia (IL)

(73) Assignee: Yissum Research Development Company of The Hebrew University of Jerusalem Ltd, Jerusalem (IL)

( * ) Notice: Subject to any disclaimer, the term of this patent is extended or adjusted under 35 U.S.C. 154(b) by 0 days.

(21) Appl. No.: 15/549,344

(22) PCT Filed: Feb. 7, 2016

(86) PCT No.: PCT/IL2016/050140
§ 371 (c)(1),
(2) Date: Aug. 7, 2017

(87) PCT Pub. No.: WO2016/125175
PCT Pub. Date: Aug. 11, 2016

(65) Prior Publication Data
US 2018/0037502 A1 Feb. 8, 2018

Related U.S. Application Data

(60) Provisional application No. 62/113,446, filed on Feb. 8, 2015.

(51) Int. Cl.
| | | |
|---|---|---|
| *C04B 20/10* | (2006.01) | |
| *C04B 22/12* | (2006.01) | |
| *C04B 28/14* | (2006.01) | |
| *C04B 111/00* | (2006.01) | |
| *C04B 111/20* | (2006.01) | |

(52) U.S. Cl.
CPC ........ C04B 20/1066 (2013.01); C04B 22/128 (2013.01); C04B 28/14 (2013.01); C04B 28/145 (2013.01); *C04B 2111/00612* (2013.01); *C04B 2111/2061* (2013.01); *C04B 2111/2069* (2013.01)

(58) Field of Classification Search
CPC ... C04B 20/1066; C04B 22/128; C04B 28/14; C04B 28/145; C04B 2111/00612; C04B 2111/2061; C04B 2111/2069
See application file for complete search history.

(56) References Cited

FOREIGN PATENT DOCUMENTS

| | | |
|---|---|---|
| CN | 102229769 A | 11/2011 |
| EP | 0633064 A1 | 6/1994 |
| JP | 2005-53078 A | 3/2005 |
| WO | 9805601 A1 | 2/1998 |
| WO | 01/00541 A1 | 1/2001 |
| WO | 2012/066545 A2 | 5/2012 |
| WO | 2015019348 A2 | 2/2015 |

OTHER PUBLICATIONS

Gnayem et al. "Hierarchical Nanostructured 3D Flowerlike BiOClxBr1-x Semiconductors with Exceptional Visible Light Photocatalytic Activity" ACS Catalysis, Jan. 2, 2013, pp. 186-191, 3, American Chemical Society, Washington, DC, USA.
Gnayem et al.; "Hybrid bismuth oxyhalides@gypsum as self-cleaning composites: novel aspects of a sustainable photocatalytic technology for solar environmental cleanup", RSC Adv. 2015., 5, pp. 66650-66656.
International Search Report dated Jul. 12, 2016 from corresponding International Application No. PCT/IL2016/050140, 3 pages.
Written Opinion dated Jul. 12, 2016 from corresponding International Application No. PCT/IL2016/050140, 6 pages.

*Primary Examiner* — Anthony J Green
(74) *Attorney, Agent, or Firm* — Ohlandt, Greeley, Ruggiero & Perle, L.L.P.

(57) ABSTRACT

Bismuth oxyhalide-added building materials are disclosed. The building material is a binder-containing building material, which sets and harden when mixed with water, such as gypsum and cement-based building material. Methods for applying bismuth oxyhalide—comprising coatings onto surfaces of building materials, to protect them against pollutants, are described.

8 Claims, 5 Drawing Sheets

ADDITIVE-INCORPORATED BUILDING MATERIALS

Building constructions are predominantly made of mortar, concrete and gypsum. Exposure of these objects to specific environmental conditions (rough weather conditions, growing environmental pollution, and microbial action) leads to change not only in the aesthetical appearance of building facades and walls but also to physical degradation and corrosion. To protect the surfaces of cementitious materials and minimize the negative influence of environment conditions on buildings, advanced oxidation processes such as heterogeneous photocatalysis have started to play a major role in the building industry. Compounds exhibiting photocatalytic activity are capable of accelerating oxidation reactions in response to light irradiation and may therefore be useful in decomposing pollutants present in the atmosphere.

The $TiO_2$ powder manufactured by Degussa Corporation under the name P-25 is a commercially available photocatalyst. Its incorporation into hydraulic binders (building materials which require water to harden, specifically cement) for the purpose of producing a 'self-cleaning' cement capable of preserving the color features of architectural concrete against the attack of atmospheric pollutants is described in WO 98/05601 (in the name of Italcementi SPA), where it is explained that the photocatalyst particles are uniformly distributed throughout the mass of the cement, such that the photocatalyst is present in its inner layers, and not only on the surface of the binder. A preferred mode of addition described in WO 98/05601 involves thoroughly mixing the $TiO_2$ particles with the cement powder to afford a dry premix which is subsequently combined with water to obtain a desired paste consistency for spreading over a surface.

Applying $TiO_2$-containing coatings onto surfaces has also been illustrated. The generation of such coatings is described in EP 633064, where the coating was achieved with the aid of suitable adhesives, such as silicon or cement; in U.S. Pat. No. 6,824,826, where special preparations of colloidal $TiO_2$ were made and subsequently brush-applied over a mortar, stone or marble substrate; and in JP 2005/053078, where a photocatalyst-containing cement paste layer is applied onto a concrete block.

The synthesis of a novel class of photocatalysts consisting of mixed bismuth oxyhalide compounds of the formula $BiOCl_yBr_{1-y}$ [0.5<y, preferably 0.6≤y≤0.95] was reported by Gnayem and Sasson in ACS Catalysis 3, p. 186-191 (2013) and in WO 2012/066545. It was shown that the $BiOClBr_{1-y}$ compounds, which are characterized by unique surface morphology, display strong photocatalytic activity in aqueous medium in response to visible light irradiation, effectively advancing the decomposition of organic pollutants present in water.

Another novel class of powerful photocatalysts consisting of) $Bi^{(0)}$-doped bismuth oxyhalides is disclosed in co-assigned PCT/IL2014/050702 (≡WO 2015/019348) where the synthesis, characterization and utility of $Bi^{(0)}$ doped-BiOCl, $Bi^{(0)}$doped-BiOBr and $Bi^{(0)}$ doped-$BiOCl_yBr_{1-y}$ [0.6≤y≤0.95] are described.

We have now found that under an exposure to light irradiation, including natural solar light at winter time, $BiOCl_yBr_{1-y}$ incorporated building materials and $Bi^{(0)}$-doped bismuth oxyhalides-incorporated building materials display self-cleaning properties. For example, the experimental results reported below indicate that organic compounds deposited onto the surface of $BiOCl_yBr_{1-y}$-incorporated gypsum or $BiOCl_yBr_{1-y}$ incorporated mortar undergo swift decomposition in response to surprisingly short exposure period to visible light irradiation, natural afternoon sunlight or other light sources.

Accordingly, the invention is directed bismuth oxyhalide-added building material, wherein the bismuth oxyhalide is selected from the group consisting of:
$BiOCl_yBr_{1-y}$ [0.6≤y≤0.95];
$Bi^{(0)}$ doped-BiOCl;
$Bi^{(0)}$ doped-BiOBr; and
$Bi^{(0)}$ doped-$BiOCl_yBr_{1-y}$ [0.6≤y≤0.95].

$BiOCl_yBr_{1-y}$-added building material [0.6≤y≤0.95] and $Bi^{(0)}$ doped-$BiOCl_yBr_{1-y}$-added building material [0.6≤y≤0.95] are preferred. The $BiOCl_yBr_{1-y}$ particles are in the form of microspheres possessing flower-like surface morphology, said microspheres having thin plates extending radially from the surface of the microspheres outward.

The $BiOCl_yBr_{1-y}$ and/or $Bi^{(0)}$-doped bismuth oxyhalide particles set forth above (sometimes collectively named herein "bismuth oxyhalide") are especially suitable for use in binder-containing building materials, that is, building materials which set and harden upon combining with water, such as gypsum and cement-based building materials (plaster, mortar, stucco and concrete). Thus, the invention provides bismuth oxyhalide—added building material selected from the group consisting of:
bismuth oxyhalide-added gypsum, for example, $BiOCl_yBr_{1-y}$-added gypsum; and
bismuth oxyhalide-added, cement-containing building material, for example, $BiOCl_yBr_{1-y}$-added, cement-containing building material.

The photocatalyst particles can be incorporated into to the building material using different methods, for example, by addition to, and mixing with, the dry raw material (cement, mortar or concrete ingredients) that is, via bulk addition, or by forming a bismuth oxyhalide-comprising coating (e.g., $BiOCl_yBr_{1-y}$-containing coating) onto surfaces of the building material. The term "bismuth oxyhalide-added building material" (or "bismuth oxyhalide-incorporated building material") is meant to include all forms of addition of bismuth oxyhalide, e. g., bulk addition and coatings applied onto surfaces of building materials. The latter method is preferred, spreading the active particles on the outer faces of the object, in place of distributing the active particles across the entire mass of the building material. It has been found that the generation of such bismuth oxyhalide-comprising coatings (e.g., $BiOCl_yBr_{1-y}$-containing coatings) with 'self-cleaning' properties can be accomplished by applying an aqueous suspension of the bismuth oxyhalide (e.g., $BiOCl_yBr_{1-y}$) particles onto the surface of the progressively hardening mass of the building material. Thus, according to this preferred embodiment of the invention, the bismuth oxyhalide (e.g., $BiOCl_yBr_{1-y}$) particles are incorporated into the building material in the form of a coating applied onto a newly-formed surface as part of its manufacturing process, or on an existing surface.

To produce a photocatalyst-containing coating on a newly-formed surface, for example, on a gypsum, a mortar or a concrete surface, the raw material is mixed with water, the setting reaction is allowed to begin and the photocatalyst is added almost immediately after the mass begins to harden, for example, by spraying an aqueous suspension of the photocatalyst on the progressively hardening mass.

To produce a photocatalyst-containing coating on an existing surface of an object made of a cement-based construction material, for example, on a concrete wall, a dispersion comprising said construction material, water (or other dispersant) and the photocatalyst could be used. The photocatalyst may also be added to a paint or a coating formulation; the photocatalyst-added paint, which forms another aspect of the invention, is applied onto the existing surface and allowed to dry and cure. For example, a preferred method consists of applying a fresh cement-based plaster or cement-based mortar onto a substrate and subsequently spraying an aqueous suspension of the $BiOCl_yBr_{1-y}$ particles onto the fresh coating.

A preferred embodiment of the bismuth oxyhalide-added building material of the invention is a bismuth oxyhalide-added gypsum, and in particular, bismuth oxyhalide-coated gypsum, and specifically, $BiOCl_yBr_{1-y}$-coated gypsum (by "gypsum" is meant $CaSO_4.2H_2O$). The fabrication of a $BiOCl_yBr_{1-y}$-coated gypsum is effectively accomplished by means of applying an aqueous suspension of $BiOCl_yBr_{1-y}$ particles onto the surface of a moistened, hardening mass formed when mixing plaster of Paris ($CaSO_4.0.5H_2O$) with water (i.e., when the moistened mass of plaster is still in the process of rehydration to gypsum). When allowed to set and harden, the so-formed $BiOCl_yBr_{1-y}$-coated gypsum is characterized in that the photocatalyst microspheres are distributed across a relatively thin coating layer (e.g., to 100 μm thick coating, preferably from 50 to 80 μm) deposited on the surface of the gypsum, with the gypsum bulk being essentially devoid of $BiOCl_yBr_{1-y}$ particles.

Thus, a specific embodiment of the invention is directed to bismuth oxyhalide-coated gypsum characterized in that the bismuth oxyhalide (for example, $BiOCl_yBr_{1-y}$) particles are located in a surface layer (e.g., 4 to 100 μm thick layer) deposited on a gypsum-made base, with said gypsum-made base being essentially free of bismuth oxyhalide particles. By "essentially free" is meant that less than 30%, preferably less than 10% by weight of the photocatalyst particles are located in the gypsum-made base. Preferably, the gypsum-made base is free of photocatalyst such as $BiOCl_yBr_{1-y}$ particles.

A method for preparing bismuth oxyhalide-coated gypsum (e.g., $BiOCl_yBr_{1-y}$-coated gypsum) forms another aspect of the invention. The method comprises combining a dry powder of plaster of Paris with water and adding bismuth oxyhalide (e.g., $BiOCl_yBr_{1-y}$) microspheres, preferably during the setting stage. For example, the method comprises mixing dry plaster of Paris powder with water, allowing the so-formed mass to set and harden partially, applying onto the surface of the progressively hardening mass an aqueous suspension of the $BiOCl_yBr_{1-y}$ [$0.6 \le y \le 0.95$] microspheres, and allowing the mass to dry and solidify.

The mixed chloride-bromide bismuth oxyhalides which are useful as additives for building materials, paints and coatings according to the invention have the formula $BiOCl_yBr_{1-y}$, with the chloride being the predominant halide, y preferably being between 0.6 and 0.95, more preferably between 0.7 and 0.95 (e.g., 0.75-0.90). An especially preferred catalyst is the $BiOCl_{0.8\pm\delta}Br_{0.2\pm\delta}$ ($0.01 \le \delta \le 0.05$).

The $BiOCl_yBr_{1-y}$ compounds are prepared by the methods set out in detail WO 2012/066545. Briefly, a reaction vessel is charged with water and an acid, e.g., an organic acid such as glacial acetic acid, following which a bismuth source, for example bismuth nitrate ($Bi(NO_3)_3.5H_2O$), is dissolved in the acidic environment. On addition of suitable chloride and bromide sources to the solution (preferably quaternary ammonium salts in the form of salts having the formulas $N^+R_1R_2R_3R_4Cl^-$ and $N^+R_1R_2R_3R_4Br^-$, wherein $R_1$, $R_2$, $R_3$ and $R_4$ are alkyl groups), the product $BiOCl_yBr_{1-y}$ is almost instantaneously precipitated from the solution. On separating the solid product from the liquid phase by filtration, washing and drying same, a powder consisting of microspheres is collected, exhibiting unique particle morphology as reported by Gnayem and Sasson (supra) and WO 2012/066545. Scanning electron microscopy indicates that the so-formed microspheres have a diameter from 1.5 to 5 microns, more specifically from 2 to 4 microns. The microspheres possess flower-like morphology, with thin plates ('leaves') having lateral dimensions of a few hundreds of nanometers (from 50 to 200 nm) extending radially from the surface of the microsphere outward. The thickness of these plates is from 5 to 15 nm, e.g., about 10 nm. An illustrative working example for preparing the $BiOCl_{0.8\pm\delta}Br_{0.2\pm\delta}$ compound ($0.01 < \delta < 0.05$) is given below.

As mentioned above, $Bi^{(0)}$-doped bismuth oxyhalides can also be used as additives in building materials, paints and coatings. In the $Bi^{(0)}$-doped bismuth oxyhalide, the $Bi^{(0)}$ dopant level is in the range from 0.1 to about 7 molar %, more specifically from 0.1 to 5 molar % (e.g., 0.1 to 3 molar %), relative to the total amount of the bismuth. The $Bi^{(0)}$-doped bismuth oxyhalides are obtained by charging a reaction vessel with water, an acid (e.g., glacial acetic acid) and a bismuth source (e.g., bismuth nitrate) and stirring same to form a clear, transparent solution. The so-formed solution is combined with one or more quaternary ammonium halide salts and a reducing agent such as sodium borohydride (and optionally ethanol which acts as a defoamer). The reaction mixture is allowed to stand under stirring at about room temperature. The precipitate is separated from the liquid reaction medium, washed and dried. Photoelectron spectroscopy can be used for the analysis of the) $Bi^{(0)}$-doped bismuth oxyhalides and determination of the chemical state of bismuth present in the catalyst, e. g., on the catalyst surface. The binding energies of the Bi metal 4f band are ~157 eV and ~162 eV. For bismuth compounds, such as $Bi_2O_3$, the peaks located at ~159 eV and ~164 eV are assigned to Bi 4f 7/2 and Bi 4f 5/2, respectively. X-ray photoelectron spectrum of a sample of $Bi^{(0)}$-doped bismuth oxyhalides displays peaks at binding energies of 157±1 eV and 162±1 eV, assigned to the $Bi_{(metal)}$ 4f (7/2, 5/2) photoelectrons, respectively [in addition to the peaks assigned to Bi ($_{BiOCl,\ BiOBr,\ and\ BiOCl_yBr_{1-y}}$) 4f (7/2, 5/2)]. Exemplary $Bi^{(0)}$-doped bismuth oxyhalides which can be incorporated in building materials according to the present invention are tabulated in Table 1; illustrative working examples are given below.

TABLE 1

| Compound | $Bi^{(0)}$ 4f 7/2 XPS peak | Dopant level |
| --- | --- | --- |
| $Bi^{(0)}$ doped-BiOCl | 156.9 eV | ~1 mole % |
| $Bi^{(0)}$doped-$BiOCl_{0.875}Br_{0.125}$ | 156.9 eV | ~1 mole % |
| $Bi^{(0)}$doped-$BiOCl_{0.875}Br_{0.125}$ | 157.1 eV | ~2 mole % |
| $Bi^{(0)}$ doped-BiOBr | 156.8 eV | ~1.5 mole % |
| $Bi^{(0)}$doped-$BiOCl_{0.670}Br_{0.330}$ | 157.7 eV | ~3 mole % |

Hereinafter, a fabrication method of a newly-formed gypsum having $BiOCl_yBr_{1-y}$ coating thereon is described in detail for the purpose of illustration. It should be understood, however, that the same method could be utilized to apply coatings of other photocatalysts (e.g., the aforementioned $Bi^{(0)}$-doped bismuth oxyhalides) on newly-formed surfaces of various building materials.

To fabricate $BiOCl_yBr_{1-y}$-coated gypsum, a dry plaster powder is mixed with water and the $BiOCl_yBr_{1-y}$ is added, preferably during the setting stage. The rehydration reaction consumes ~20 parts of water per 100 part of plaster powder by weight, but excess water is preferably used in a manufacturing process, to ensure complete rehydration of plaster back to gypsum and provide sufficient fluidity. Therefore, from 40 to 80 parts of water are used per 100 part of plaster by weight. We prefer to divide this total amount of water into at least two portions. The first portion consists of about 60-95% of the total amount of water; it is combined with the dry plaster powder, and the setting reaction is allowed to begin. The addition of the photocatalyst is performed after the very initial hardening of the bulk takes place: on precipitation of gypsum crystals and creation of a gypsum surface, a second amount of water is added, along with $BiOCl_yBr_{1-y}$ microspheres suspended therein. In this way, we are able to distribute the $BiOCl_yBr_{1-y}$ microspheres preferentially on the surface of the progressively solidifying mass, to form $BiOCl_yBr_{1-y}$ coating thereon, thereby avoiding the effect of dilution which would occur if the photocatalyst is simply mixed with the bulk of the construction material (e.g., by simply using a dry premix).

The concentration of the $BiOCl_yBr_{1-y}$ in the $BiOCl_yBr_{1-y}$-added gypsum is preferably from 0.1 to 10.0% by weight, more preferably from 0.5 to 5.0% by weight, and even more preferably from 1.0 to 3.0% by weight. Experimental work conducted in support of this invention shows that 2.0 wt % and 4 wt % $BiOCl_yBr_{1-y}$-added gypsum samples are comparable in their ability to achieve rapid decomposition of contaminants absorbed onto their surface, demonstrating that $BiOCl_yBr_{1-y}$ display high photocatalytic efficiency in construction materials in a low load level. The $BiOCl_yBr_{1-y}$-added gypsum of the invention can be applied for surface finishing, e.g., for wall-covering (as gypsum-based mortar and plaster), a material for interior walls in buildings or in the preparation of gypsum lath; it can also be applied on plastic, aluminum glass and quartz-made surfaces.

As pointed out above, bismuth oxyhalide (e.g., $BiOCl_yBr_{1-y}$) particles can be added to cement-based building materials. The term cement is used herein to indicate different types of cements, such as Portland cement and lime cement. Cement, fine aggregates (namely sand) and water are used to form plaster, stucco and mortar. The cement/aggregate ratio in a mortar formulation is generally the classical 1:3 weight ratio. However, the invention is not limited to such formulation; for example, the cement/aggregate can be mixed in any weight ratio from 1:2 to 1:3.1. Cement, water, fine aggregates and coarse aggregates are mixed together to produce concrete. Cement-based mortar and plaster may deteriorate under prolonged exposure to outdoors and indoors pollutants. To suppress this undesired degradation and provide cement-based building materials with self-cleaning surface properties, bismuth oxyhalide (e.g., $BiOCl_yBr_{1-y}$) can be applied onto surfaces of cement-based building materials. In addition, to preserve the appearance of structural and decorative cement-based objects, bismuth oxyhalide (e.g., $BiOCl_yBr_{1-y}$) particles are deposited on the faces of said objects with the aid of a fresh surface layer consisting of cement-based mortar or plaster. Thus, an especially preferred embodiment of the invention relates to a method for preparing bismuth oxyhalide added, cement-containing building material applied as a self-cleaning coating onto a substrate, comprising mixing cement with aggregates and water to form a fresh plaster, mortar or stucco formulation, applying said formulation onto a plaster, mortar, stucco or concrete substrate to form a fresh coating on said substrate, and applying bismuth oxyhalide-containing aqueous suspension (for example, $BiOCl_yBr_{1-y}$-containing aqueous suspension) on said fresh coating.

The experimental results reported below show that with the aid of such fabrication method, strongly adhering $BiOCl_yBr_{1-y}$-containing coatings can be formed over plaster, mortar and concrete substrates. Thus, bismuth oxyhalide-coated mortar, plaster or concrete (or other cement-based materials) constitute a specific embodiment of the invention.

The concentration of the aqueous suspension used to produce the coating is in the range of 2 g to 10 g bismuth oxyhalide per 100 g water. The aqueous suspension is preferably devoid of auxiliary additives. The coating is generated by different techniques, such as spray coating and brushing. In general, not less than 40% by weight of the particles on the resultant surface layer consist of the bismuth oxyhalide particles, such as $BiOCl_yBr_{1-y}$, and preferably not less than 70% by weight (estimated by SEM or XRD).

Aqueous suspension comprising bismuth oxyhalide, and coating compositions comprising bismuth oxyhalide in a solvent having suitable consistency to be spread over, sprayed, brushed or otherwise applied onto surfaces to be protected (e.g., cement-based surfaces) form additional aspect of the invention.

In the experimental work reported below, the photocatalytic activity of $BiOCl_yBr_{1-y}$-coated gypsum test specimens was evaluated using Rhodamine B (RhB) dye as an exemplary contaminant. RhB was sprayed onto the upper face of the specimen; it has the structure depicted below:

The gradually vanishing pink color, indicative of the decomposition of the dye, is readily visible and the rate of disappearance can be quantified using chromatic techniques to obtain a concentration versus time curve. The experimental results reported below indicate that a pollutant deposited onto the surface of $BiOCl_yBr_{1-y}$-coated gypsum undergoes rapid decomposition under UV-Vis, visible light and sunlight irradiation. For example, $BiOCl_{0.8}Br_{0.2}$-coated gypsum decomposes RhB deposited thereon (30 ppm) within 2.5 minutes under sun irradiation and within 4 minutes using Xe arc lamp visible light irradiation.

The 'self-cleaning' properties of $BiOCl_yBr_{1-y}$-coated gypsum specimen have also been demonstrated in the destruction of naphthalene—a fairly persistent pollutant which would undergo only a negligible degree of photolysis under visible light. However, the experimental results reported below indicate that almost full decomposition of naphthalene applied on a face of a $BiOCl_yBr_{1-y}$-coated gypsum is achievable following irradiation of the gypsum test specimen with visible light.

Accordingly, in another aspect, the invention provides a method for preserving the appearance of construction materials (e.g., cement, gypsum, mortar, concrete), or paints and the like, from the attack of pollutants, comprising adding to said construction materials or paints mixed bismuth oxyhalide photocatalyst of the formula $BiOCl_yBr_{1-y}$, or $Bi^{(0)}$-doped bismuth oxyhalides, as identified above.

The $BiOCl_yBr_{1-y}$-containing coatings are useful in preserving clean faces of interior and exterior walls, owing to their ability to display self-cleaning action in response to exposure to light irradiation, such that pollutants absorbed onto the faces of the walls or other structures are rapidly decomposed. It is noted that unlike titanium dioxide-containing coatings, $BiOCl_yBr_{1-y}$-containing coatings of the invention have excellent visible light photocatalytic activity. To induce the action of the self-cleaning coating of the invention, UV-Vis and visible light sources, including xenon arc lamps, halogen lamps, fluorescent lamp or LED lamps can be used; sunlight irradiation is also effective.

In general, the irradiation period needed to remove the pollutant depends on the persistence of the pollutant, its concentration on the self-cleaning surface, the catalyst employed and the loading of the catalyst in the self-cleaning surface. The irradiation period is not less than 2-5 minutes, e.g., between about 10 minutes and several hours, and the progress of the decomposition of the targeted contaminants can be monitored using conventional techniques, such as spectroscopic and optical methods.

BRIEF DESCRIPTION OF THE DRAWINGS

FIG. 2c shows the topography of a $BiOCl_{0.8}Br_{0.2}$-coated gypsum sample with the corresponding EDS spectrum (FIG. 2d).

FIGS. 4a-4i are photos showing the gradual decomposition over time of a dye stain applied onto $BiOCl_{0.8}Br_{0.2}$-coated gypsum on exposure to Xe visible light lamp.

FIGS. 5a-5f are photos showing the gradual decomposition over time of a dye stain applied onto $BiOCl_{0.8}Br_{0.2}$-coated gypsum on exposure to natural sunlight.

EXAMPLES

Methods

X-ray powder diffraction measurements were performed on the D8 Advance diffractometer (Bruker AXS, Karlsruhe, Germany) with a goniometer radius 217.5 mm, secondary graphite monochromator, 2° Sollers slits and 0.2 mm receiving slit. XRD patterns within the range 5° to 70° 2θ were recorded at room temperature using CuKα radiation (λ=1.5418 Å) with the following measurement conditions: tube voltage of 40 kV, tube current of 40 mA, step-scan mode with a step size of 0.02° 2θ and counting time of 1 s/step. Gypsum plasters coated by $BiOCl_yBr_{1-y}$ were placed on sample stage that is regulated along the vertical axis, and allows obtaining XRD patterns from as-manufactured samples with various sizes. Uncoated material of plaster was grinded in agate mortar to powder and placed into low-background quartz sample holders.

Morphological observations and chemical analysis were performed with environmental scanning electron microscope (ESEM) Quanta 200 (FEI Company, Netherlands) equipped with EDS detector (EDAX-TSL, USA) and with the Extra High Resolution Scanning Electron Microscopy (XHR SEM) Magellan 400 L (FEICompany, Netherland) equipped with large area EDS silicon drift detector Oxford X-Max (Oxford Instruments, UK).

Total Organic Carbon (TOC) measurements were conducted using SKALAR PRIMACSSLC Solid TOC ANALYZER, Model no. 2C522901.

Example 1

$BiOCl_{0.8}Br_{0.2}$-Coated Gypsum

Synthesis of $BiOCl_{0.8}Br_{0.2}$

Deionized water (75 ml), glacial acetic acid (35 ml) and bismuth nitrate (9.18 g) are added to a flask and mixed at room temperature for fifteen minutes until a clear, transparent solution is formed. Cetyltrimethylammonium bromide (1.378 g dissolved in 10 ml of water) and Cetyltrimethylammonium chloride (4.85 g in the form of 25 wt % aqueous solution) are added to the solution, for additional 30 minutes of mixing at room temperature. The white precipitate thus formed is separated from the liquid phase by filtration, washed five times with ethanol (20 ml) and five times with water (50 ml), in order to remove the non-reactive organic species. The solid is then dried (in air). The weight of the solid collected is 7 g (yield=91%).

Preparation of $BiOCl_{0.8}Br_{0.2}$-Coated Gypsum

Samples were prepared according to the following procedure. A commercially available plaster powder (50 g; from Tambur, Israel) was mixed with distilled water (20 ml). The so-formed mixture was poured into a petri dish and allowed to set for about five minutes. A suspension consisting of the $BiOCl_{0.8}Br_{0.2}$ photocatalyst in water (5-10 ml) was then sprayed onto the surface of the mass while the mass is still in the process of hardening (the amount of $BiOCl_{0.8}Br_{0.2}$ photocatalyst in the suspension was adjusted to obtain either 1% by weight, 2% by weight and 4% by weight photocatalyst in the dry gypsum sample). The gypsum plaster was then allowed to complete its hardening.

Characterization of $BiOCl_{0.8}Br_{0.2}$-Coated Gypsum

Figure 1:
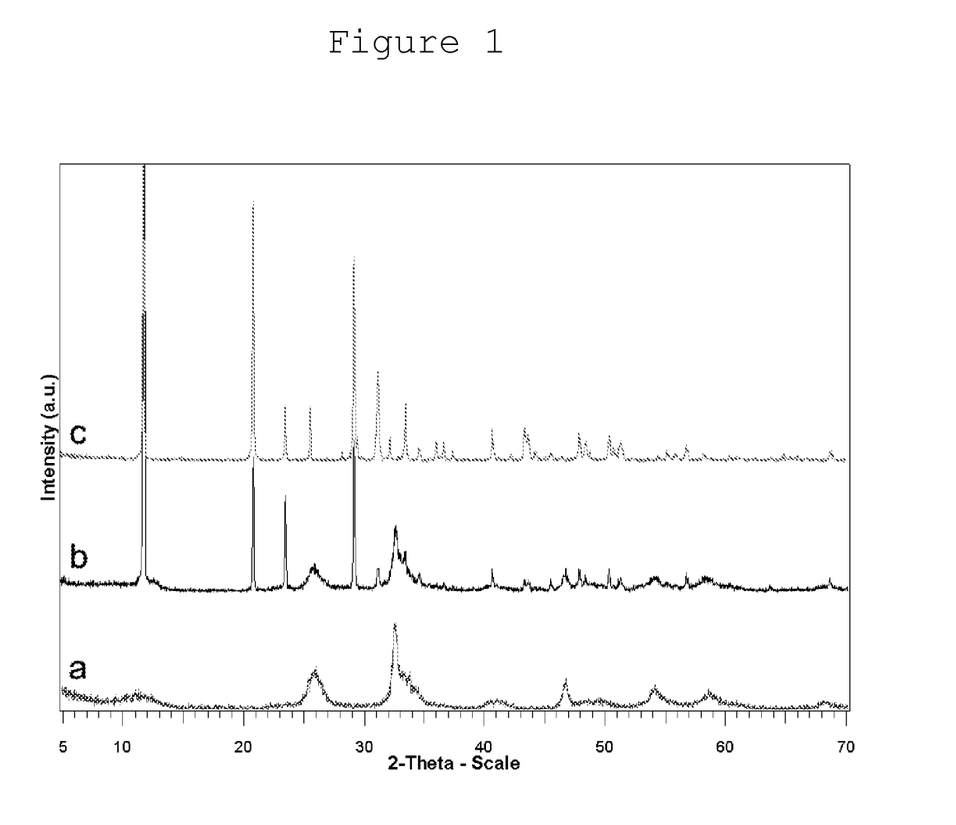
FIG. 1 shows X-ray powder diffraction patterns of the $BiOCl_{0.8}Br_{0.2}$ photocatalyst (a), the $BiOCl_{0.8}Br_{0.2}$-coated gypsum (b) and pure gypsum (c).

The X-ray powder diffraction patterns of the as-synthesized $BiOCl_{0.8}Br_{0.2}$, the $BiOCl_{0.8}Br_{0.2}$-coated gypsum and pure gypsum are shown in FIG. 1 (indicated a, b and c, respectively). The diffraction pattern of the $BiOCl_{0.8}Br_{0.2}$-coated gypsum (1b) exhibits peaks assigned either to the $BiOCl_{0.8}Br_{0.2}$ photocatalyst or pure gypsum. In particular, one or more characteristic peaks (relatively broad) which could be used to detect the presence of the photocatalyst in the gypsum are at positions ~11.5, 26, 32.5, 41, 46.8, 54.3 and 58.92θ (±0.1 2θ).

Figure 2A:
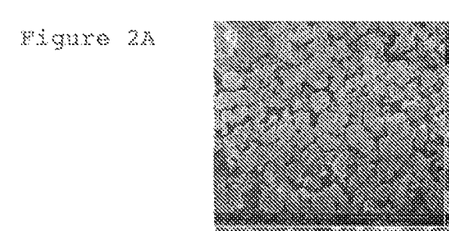
FIGS. 2a and 2b are images produced with a scanning electron microscope showing the surface morphology of $BiOCl_{0.8}Br_{0.2}$.
Figure 2B:
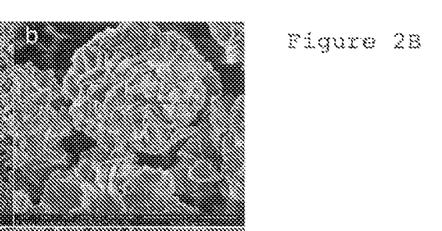
Figures 2C, 2D:
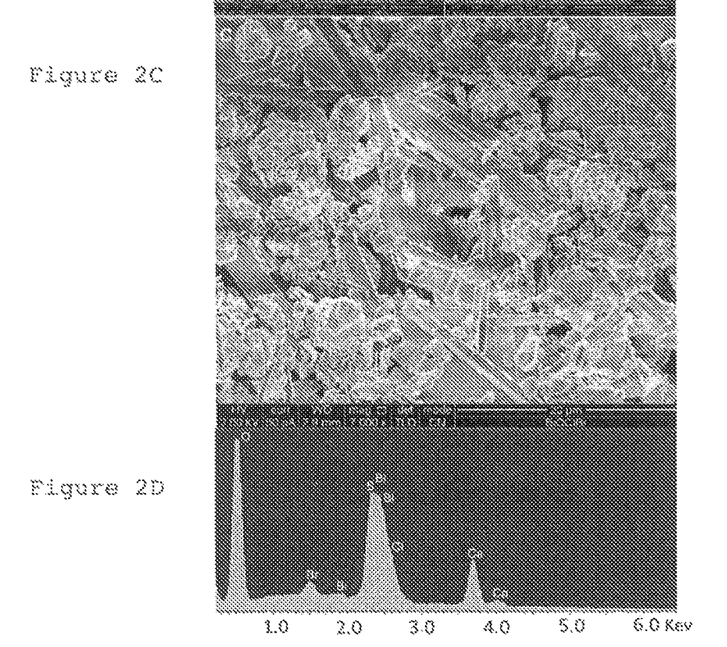

SEM images of the as-synthesized $BiOCl_{0.8}Br_{0.2}$ are shown in FIGS. 2a and 2b. The photocatalyst particles have a shape of microspheres exhibiting flower-like surface morphology with a size about 3 μm, which are built of thin plates having lateral dimensions of hundreds of nanometers. Although the lateral dimensions of the plates were about hundreds of nanometers, their thickness is about 10 nm only. The SEM image of the $BiOCl_{0.8}Br_{0.2}$-added gypsum (FIG. 2c) illustrates the formation of a $BiOCl_{0.8}Br_{0.2}$ coating, indicating the presence of the $BiOCl_{0.8}Br_{0.2}$ microspheres on the surface of the gypsum; the elongated gypsum crystals are also perfectly visible. The adduced EDS spectrum (FIG. 2d) confirms the chemical composition of the $BiOCl_{0.8}Br_{0.2}$-coated gypsum.

Figure 3A:
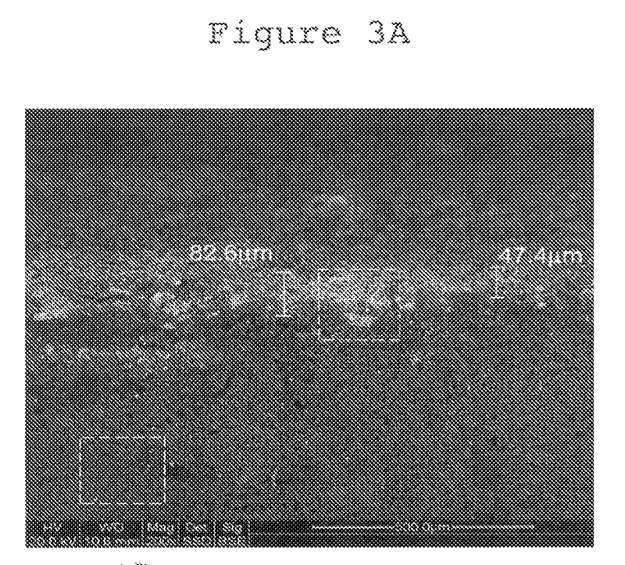
FIG. 3A is an image produced with a scanning electron microscope showing a cross section of $BiOCl_{0.8}Br_{0.2}$-coated gypsum sample
Figure 3B:
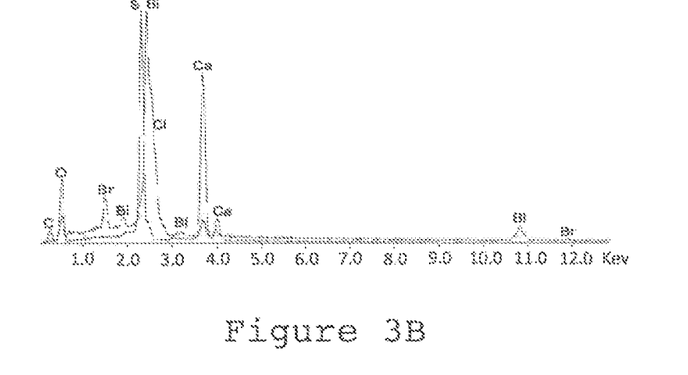
FIG. 3B shows EDS spectra corresponding to two distinct regions in the sample.

To determine the distribution and location of the $BiOCl_{0.8}Br_{0.2}$ particles across the sample, SEM images of the cross section of the sample were generated. It was found that the $BiOCl_{0.8}Br_{0.2}$ is absent from the bulk of the gypsum while it is present in the superficial layer. The SEM image obtained from cross-sectional sample is shown in FIG. 3A. As is clearly seen from FIG. 3A, $BiOCl_{0.8}Br_{0.2}$ photocatalyst consists of micron size particles exhibiting very strong contrast at back scattered electron (BSE) imaging. The thickness of coating layer is about 50-80 µm. There are two distinct regions which are marked by dashed squares in FIG. 3A: the upper square indicates the coating region whereas the lower square corresponds to the bulk of the sample; the two regions were subjected to elemental analysis and the EDS spectra acquired from the marked areas are shown in FIG. 3B (the brown and red lines correspond to the coating and bulk regions, respectively; the brown line is the line which includes the Bi-assigned peaks). The EDS analysis shows that the plaster material beneath the coating layer is gypsum. A weak calcium peak appears in the EDS spectra acquired at coated regions (brown line), indicating the presence of gypsum in the coating layer, but the gypsum content is much less in the coating than in the gypsum body.

Example 2

Decomposition of Rhodamine B Applied onto the Surface of $BiOCl_{0.8}Br_{0.2}$-Coated Gypsum RhB dye (30 ppm) was sprayed on a sample of $BiOCl_{0.8}Br_{0.2}$-coated gypsum prepared as described in Example 1 (with 2% by weight photocatalyst concentration). The sample was exposed to various irradiation sources, at different day times, including natural sunlight and 300 W Xe arc lamp (Max-302, Asahi spectra). Power consumption of Max-302 is 500 VA. For visible light experiments a 422 nm cut-off filter was used. The light intensity was fixed at 70 mW/cm$^2$ and the samples were placed 10 cm away from the light's source mirror.

Figure 4:
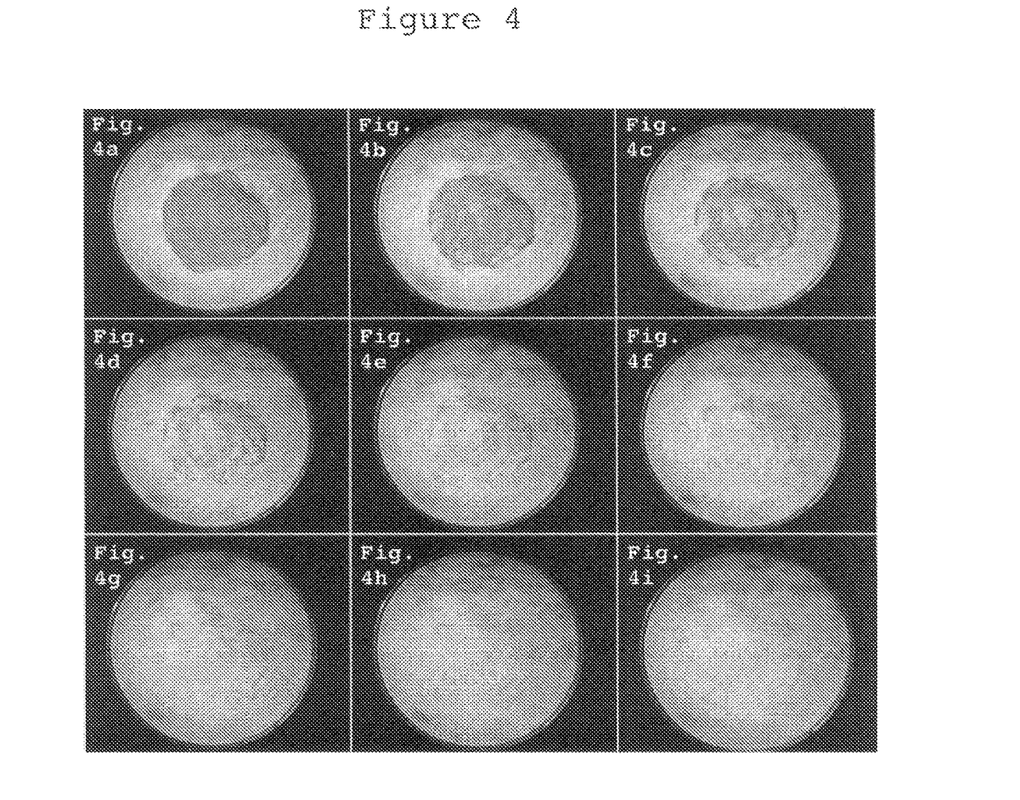

FIG. 4 demonstrates the gradual photocatalytic decomposition of a RhB stain over $BiOCl_{0.8}Br_{0.2}$-coated gypsum under Xe lamp visible light irradiation ($\lambda$=422-740 nm). Nine photos were taken for recording the photo-degradation processes with time interval of 0.5 min between one photo to the next one. The clear-cut disappearance of the dye stain is easily visible and can be monitored by naked eye. As it is clearly shown, the complete and swift destruction of the RhB dye could be successfully achieved within only 4 minutes of irradiation.

Figure 5:
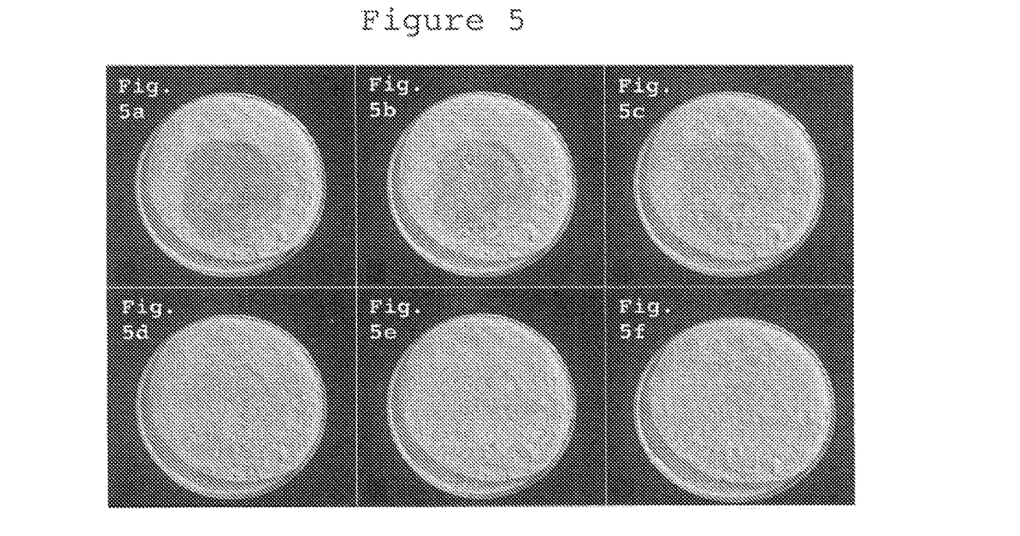

FIG. 5 illustrates that RhB dye stain applied onto a sample of $BiOCl_{0.80}Br_{0.20}$-coated gypsum undergoes swift photo-oxidation following exposure of the sample to natural afternoon solar light. Six photos were taken for recording the decomposition of the dye, at time interval of 0.5 min between one photo to another. Complete self-cleaning is achieved after 2.5 minutes of illumination.

Running the same experiments with $BiOCl_{0.8}Br_{0.2}$-coated gypsum having 4% by weight photocatalyst concentration gave essentially the same results, indicating that the mixed bismuth oxyhalide of the formula $BiOCl_yBr_{1-y}$ [$0.6 \leq y \leq 0.95$] demonstrates high efficacy when incorporated into construction materials at a low loading (e.g., >0.5% by weight, preferably >1% by weight).

The ultimate visible light driven photo-decomposition of RhB contamination presented above was tested in numerous number of cycles without any loss in activity. Additionally, the prepared surfaces maintained their superb photocatalytic efficiency even after seven months after fabrication. Lastly, further experiments, conducted under the same conditions, using simple 11 W table lamp and even 6 W LED lamps demonstrated rapid photo-destruction of RhB which was accomplished within less than 60 minutes of illumination.

Example 3

Decomposition of Naphthalene Applied onto the Surface of $BiOCl_{0.8}Br_{0.2}$-Coated Gypsum Very thin gypsum plates (~1 mm thick) were prepared and coated with $BiOCl_{0.8}Br_{0.2}$ using the molding and coating procedure set forth in Example 1; an aqueous suspension of the photocatalyst was sprayed onto the surface of the progressively hardening mass in a petri dish, to achieve 2% by weight photocatalyst in the dry gypsum sample.

Two $BiOCl_{0.8}Br_{0.2}$-coated gypsum plates were prepared. Each plate was then contaminated with naphthalene (~50 mg naphthalene dissolved in ethanol; the ethanol solution was applied onto the upper face of the gypsum plate, and the ethanol was allowed to evaporate). One plate was kept in the dark whereas the other plate was illuminated with visible light (Xe, 422-740 nm; the same conditions set forth in Example 2) for 20 minutes. Both plates were then subjected to solid TOC analysis.

Figure 6:
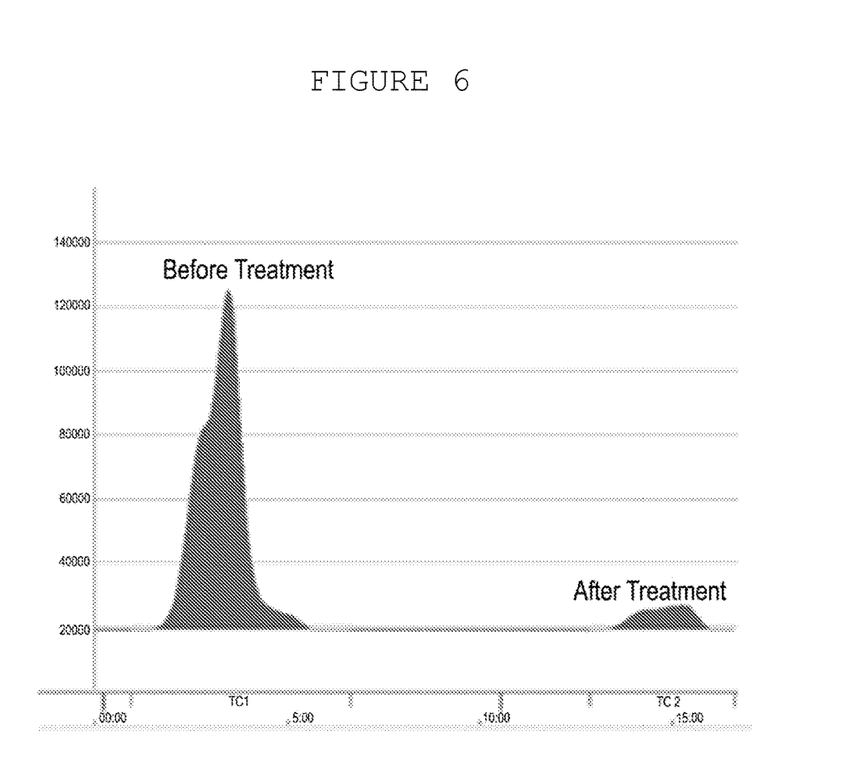
FIG. 6 is a graph showing the results of Total Organic Carbon (TOC) measurements.

The results of the solid Total Organic Carbon measurements are shown graphically in FIG. 6. The left peak indicates the total content of organic carbon in the reference sample, that is, this result corresponds to the total content of organic carbon in a contaminated gypsum plate before treatment (prior to illumination with visible light). The right peak shows the total content of organic carbon measured for the sample that was subjected to light-irradiation. It is seen that more than 90% decrease in the TOC value was achieved, indicating almost complete destruction of the organic pollutant.

Example 4

$BiOCl_{0.8}Br_{0.2}$-Coated Mortar

A mixture consisting of cement, sand and water (1:3:0.5 weight ratio) was prepared and introduced into a 9-cm diameter petri dish, to form a 1.5 cm thick mortar-made cylinder. After 30 minutes, a suspension consisting of $BiOCl_{0.8}Br_{0.2}$ particles in water (1.5 g in 20 ml of water) was applied onto the fresh mortar face, to form a uniform coating thereon (approximately 15-18 ml of the suspension were used).

Figure 7:
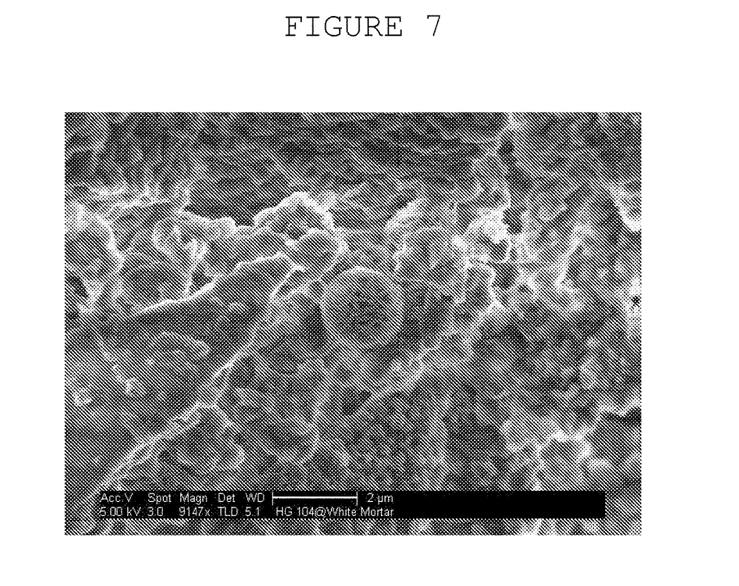
FIG. 7 is a SEM image of a $BiOCl_{0.8}Br_{0.2}$-coated mortar sample.

The SEM image of the $BiOCl_{0.8}Br_{0.2}$-coated mortar is represented in FIG. 7. The presence of a spherical $BiOCl_{0.8}Br_{0.2}$ particle, with its unique flower-like surface morphology, is easily observed in the center of the image, indicating the generation of a photocatalytically-active coating onto the mortar substrate.

Example 5

Decomposition of Rhodamine B Applied onto the Surface of $BiOCl_{0.8}Br_{0.2}$-Coated Mortar The self-cleaning function of $BiOCl_{0.8}Br_{0.2}$-coated mortar prepared as described in Example 4 was assessed in the decomposition test of RhB dye. An aqueous solution of the dye was sprayed onto the surface of a $BiOCl_{0.8}Br_{0.2}$-coated mortar to form a central pink stain (of ~4.5 cm diameter). Then, Xe lamp (422-740 nm) was used to illuminate the sample. The light intensity was fixed at 70 mW/cm$^2$ and the samples were placed cm away from the light's source mirror.

The sample was visually inspected after two minutes of light-irradiation: the pink color ascribed to Rhb has vanished, with only colorless water spots remaining on the face of $BiOCl_{0.8}Br_{0.2}$-coated mortar.

Example 6

Testing the Adhesion Strength of a $BiOCl_{0.8}Br_{0.2}$-Containing Coating Applied onto a Mortar Substrate The adhesion strength of a $BiOCl_{0.8}Br_{0.2}$-containing coating applied onto a mortar substrate was evaluated with the aid of the Cross-Cut test. To this end, a mortar plate [length×width×thickness=12 cm×13 cm×3 cm] was coated as follows. First, mortar formulation was prepared by thoroughly mixing cement, sand and water (1:3:0.5 weight ratio). This formulation was spread over one face of the plate. An aqueous suspension of the $BiOCl_{0.8}Br_{0.2}$ particles was applied onto the fresh mortar layer to form a coating thereon (2 g in 30 ml of water was used).

Fourteen days following the fabrication of the coated plate, the adhesion strength of the coating was assessed with the standard Cross-Cut test. The test consists of (i) forming a lattice pattern in the coating with the aid of a suitable tool, penetrating into the substrate, (ii) applying a brush pen and Permacel tape over the cut and (iii) inspecting the grid area with the aid of an illuminated magnifier. Approximately 10% loss in the grid area was assessed (ISO Class 2 (ASTM Class 3B), indicating a fairly strong adhesion of the photocatalytically active coating on the mortar.

Preparation 1

Preparation of $Bi^{(0)}$ Doped-Mixed Halide $BiOCl_{0.875}Br_{0.125}$

Deionized water (50 ml), glacial acetic acid (40 ml) and bismuth nitrate (14.69 g) are added to a flask and are mixed at room temperature for fifteen minutes until a clear, transparent solution is formed. The so-formed solution is added to a previously prepared solution consisting of CTAC (33.92 g of 25 wt % aqueous solution) and CTAB (1.38 g). Finally, sodium borohydride (11.456 mg) and ethanol (20 ml) are added to the reaction mixture, which is then stirred for additional 60 minutes at about 25-30° C.

The precipitate thus formed is separated from the liquid phase by filtration, washed five with ethanol (5×50 ml) and then five times with water (5×200 ml). The off-white solid is then dried (3 hours in air). The weight of the solid collected is ~9 grams.

Preparation 2

Preparation of $Bi^{(0)}$ Doped-BiOBr

Deionized water (50 ml), glacial acetic acid (40 ml) and bismuth nitrate (9.7 g) are added to a flask and are mixed at room temperature for fifteen minutes until a clear, transparent solution is formed. The so-formed solution is added to a previously prepared aqueous ethanolic solution of CTAB (1.38 g CTAB dissolved in a mixture consisting of 30 ml ethanol and 10 ml deionised water). Finally, sodium borohydride (7.56 mg) is added to the reaction mixture, which is then stirred for additional 60 minutes at about 25-30° C.

The precipitate thus formed is separated from the liquid phase by filtration, washed five with ethanol (5×50 ml) and then five times with water (5×200 ml). The off-white solid is then dried (3 hours in air). The weight of the solid collected is ~7 grams.

The invention claimed is:

1. Bismuth oxyhalide-added gypsum, wherein the bismuth oxyhalide is selected from the group consisting of $BiOCl_yBr_{1-y}$ [$0.6 \leq y \leq 0.95$]; $Bi^{(0)}$ doped-BiOCl; $Bi^{(0)}$ doped-BiOBr; and $Bi^{(0)}$ doped-$BiOCl_yBr_{1-y}$ [$0.6 \leq y \leq 0.95$].

2. Bismuth oxyhalide-added gypsum according to claim 1, which is bismuth oxyhalide-coated gypsum, wherein the bismuth oxyhalide-coated gypsum has bismuth oxyhalide particles that are located in a bismuth oxyhalide-containing surface layer deposited on a gypsum-made base, with said gypsum-made base being essentially free of bismuth oxyhalide particles.

3. Bismuth oxyhalide-added gypsum according to claim 2, wherein the thickness of the bismuth oxyhalide-containing surface layer is from 4 to 100 μm.

4. Bismuth oxyhalide-added gypsum according to claim 1, wherein the bismuth oxyhalide is selected from the group consisting of $BiOCl_yBr_{1-y}$ [$0.6 \leq y \leq 0.95$] and $Bi^{(0)}$ doped-$BiOCl_yBr_{1-y}$ [$0.6 \leq y \leq 0.95$].

5. Bismuth oxyhalide-added gypsum according to claim 4, wherein the bismuth oxyhalide is $BiOCl_yBr_{1-y}$ [$0.6 \leq y \leq 0.95$].

6. Bismuth oxyhalide-added gypsum according to claim 5, wherein the bismuth oxyhalide is $BiOCl_yBr_{1-y}$ [$0.75 \leq y \leq 0.90$].

7. Bismuth oxyhalide-added gypsum according to claim 6, wherein the $BiOCl_yBr_{1-y}$ is $BiOCl_{0.8\pm\delta}Br_{0.2\pm\delta}$ ($0.01 \leq \delta \leq 0.05$).

8. A method for preparing bismuth oxyhalide-coated gypsum, comprising mixing plaster of Paris powder ($CaSO_4 \cdot 0.5H_2O$) and water, allowing a so-formed mass to set and harden partially, applying onto the surface of the mass an aqueous suspension of bismuth oxyhalide microspheres selected from the group consisting of $BiOCl_yBr_{1-y}$ [$0.6 \leq y \leq 0.95$]; $Bi^{(0)}$ doped-BiOCl; $Bi^{(0)}$ doped-BiOBr; and $Bi^{(0)}$ doped-$BiOCl_yBr_{1-y}$ [$0.6 \leq y \leq 0.95$], and allowing the mass to dry and solidify.

* * * * *